US006666513B2

(12) United States Patent
Zheng et al.

(10) Patent No.: US 6,666,513 B2
(45) Date of Patent: Dec. 23, 2003

(54) VEHICLE SEAT DRIVE HAVING A MECHANICAL INCHWORM LINEAR MOTION ACTUATOR

(75) Inventors: Chun Hua Zheng, Staten Island, NY (US); H. Winston Maue, Northville, MI (US); Rory Patrick Pheiffer, Novi, MI (US); Luke Massery, Glenview, IL (US); Daniel Sandoval, El Paso, TX (US); Ernesto E. Blanco, Belmont, MA (US)

(73) Assignee: Lear Corporation, Southfield, MI (US)

( * ) Notice: Subject to any disclaimer, the term of this patent is extended or adjusted under 35 U.S.C. 154(b) by 3 days.

(21) Appl. No.: 10/015,443

(22) Filed: Dec. 13, 2001

(65) Prior Publication Data

US 2002/0145323 A1 Oct. 10, 2002

Related U.S. Application Data

(60) Provisional application No. 60/255,500, filed on Dec. 13, 2000.

(51) Int. Cl.$^7$ .................................................. A47C 1/02
(52) U.S. Cl. ...................................................... 297/344.1
(58) Field of Search ........................ 297/344.1, 344.24; 248/429; 188/109, 67; 74/531

(56) References Cited

U.S. PATENT DOCUMENTS

| 980,049 | A | | 12/1910 | Beyer |
| 2,858,877 | A | * | 11/1958 | Krause |
| 3,386,542 | A | | 6/1968 | Cummings |
| 3,893,730 | A | | 7/1975 | Homier et al. |
| 3,902,084 | A | | 8/1975 | May, Jr. |
| 4,387,926 | A | | 6/1983 | Van Eerden et al. |
| 4,441,381 | A | | 4/1984 | Haugk |
| 4,452,098 | A | | 6/1984 | Wallace et al. |
| 4,570,096 | A | | 2/1986 | Hara et al. |
| 4,592,591 | A | * | 6/1986 | Wiers |
| 4,938,319 | A | | 7/1990 | Ernst |
| 5,161,765 | A | | 11/1992 | Wilson |
| 5,299,853 | A | | 4/1994 | Griswold et al. |
| 5,332,942 | A | | 7/1994 | Rennex |
| 5,582,461 | A | | 12/1996 | Pickles |
| 5,823,300 | A | * | 10/1998 | Higuchi |
| 6,499,568 | B1 | * | 12/2002 | Nemeth |

* cited by examiner

Primary Examiner—Milton Nelson, Jr.
(74) Attorney, Agent, or Firm—Bill C. Panagos

(57) ABSTRACT

A vehicle seat drive for driving a vehicle seat includes a mechanical inchworm linear motion actuator. A linearly movable shaft is coupled to the vehicle seat such that the vehicle seat moves as the shaft moves. The actuator includes a jamming module and an actuation module. The jamming module has left and right jamming plates operable for engaging and disengaging the shaft while moving linearly with respect to the shaft. The actuation module is operable for applying linear forces on the jamming plates to have the jamming plates engage and disengage the shaft and move linearly with respect to the shaft. The actuation module applies a first linear force in a first linear direction on a jamming plate to have the jamming plate engage and move the shaft in the first linear direction thereby moving the vehicle seat in the first linear direction while causing the other jamming plate to disengage from the shaft. The process is repeated and reversed to move the vehicle seat in an inchworm fashion between fore and aft positions.

17 Claims, 8 Drawing Sheets

VEHICLE SEAT DRIVE HAVING A MECHANICAL INCHWORM LINEAR MOTION ACTUATOR

CROSS-REFERENCE TO RELATED APPLICATION

This application claims the benefit of U.S. provisional application Ser. No. 60/255,500, filed Dec. 13, 2000.

BACKGROUND OF THE INVENTION

1. Field of the Invention

The present invention relates to a vehicle seat drive having a mechanical inchworm linear motion actuator for driving a vehicle seat.

2. Background Art

Vehicle seat drives provide at least six degrees of automated motion. These degrees of motion include fore and aft, up and down, and forward and backward tilting. Typical vehicle seat drives use three separate DC permanent magnet motors that drive ball screws via extensive gearing to accomplish these degrees of motion. Typical vehicle seat drives are heavy and large and take up substantial foot space beneath a vehicle seat. What is needed is a lighter, less complex, and more compact vehicle seat drive which requires fewer components, is relatively cheap to manufacture, and is relatively noiseless during operation. Such a vehicle seat drive would incorporate a mechanical inchworm linear motion actuator.

Existing inchworm linear motion actuators include piezoelectric and magnetostrictive linear actuators. Piezoelectricity is the property by which a material reacts to an applied electric voltage by changing shape and, vice versa, generating an electric current in response to an applied mechanical stress. Piezoelectrics transfer electrical energy into mechanical energy and transfer mechanical energy into electrical energy. Piezoelectrics are often used in precision positioning devices as both actuators and sensors. Piezoelectrics respond only with microscopic dimensional changes, but when multi-layered, macroscopic motions can be produced.

Used in linear and rotary actuators, piezoelectrics allow for simple, highly dynamic designs that can achieve high force density and provide noiseless operation and high holding forces. However, the disadvantages of piezoelectrics include their high cost and undesirable material properties such as hysteresis creep, brittleness, and temperature sensitivity.

In the design of piezoelectric linear actuators, piezoelectric stacks are arranged to produce inchworm motion by alternating clamping and translation. The basic concept behind a piezoelectric inchworm linear motion system 10 is illustrated in FIG. 1A through FIG. 1H. System 10 includes a central piezoelectric actuator 12, left and right clamping piezoelectric actuators 14a and 14b, and a shaft 16. Central actuator 12 performs a length changing function and clamping actuators 14a and 14b perform a clamping function.

Figure 1A:
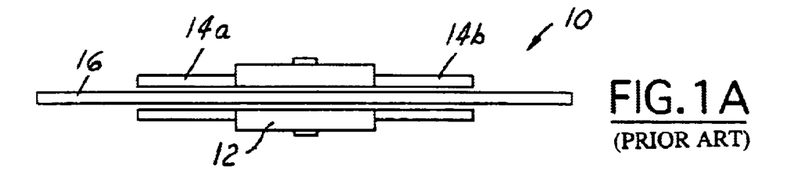
FIGS. 1A through 1H illustrate the operation of a piezo-electric inchworm linear motion system.
Figure 1B:
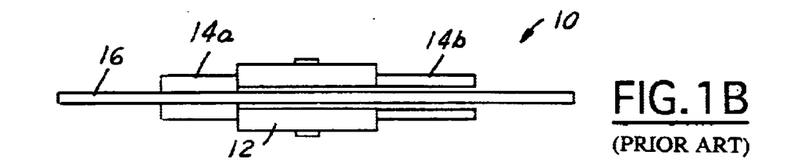
Figure 1C:
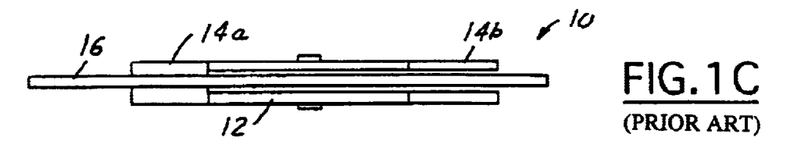
Figure 1D:
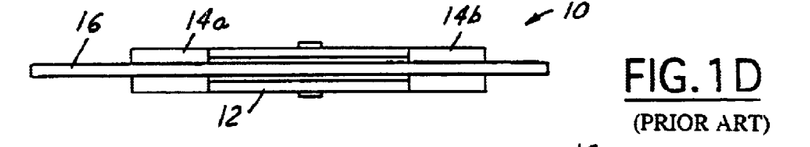
Figure 1E:
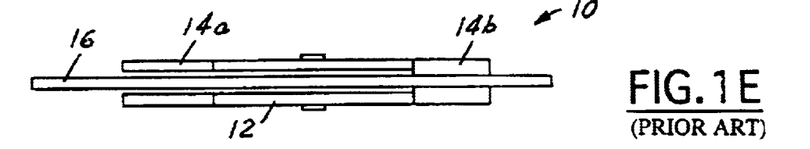
Figure 1F:
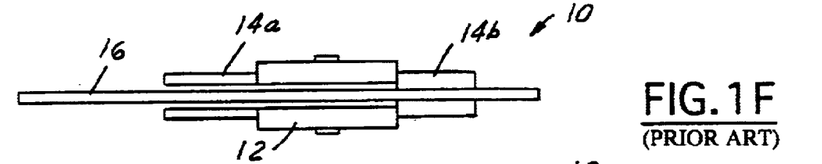
Figure 1G:
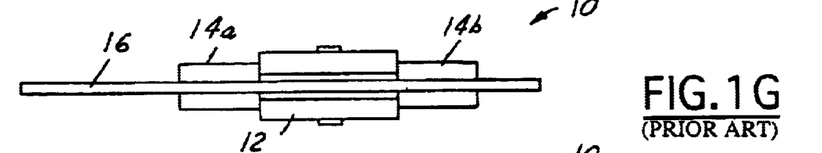
Figure 1H:
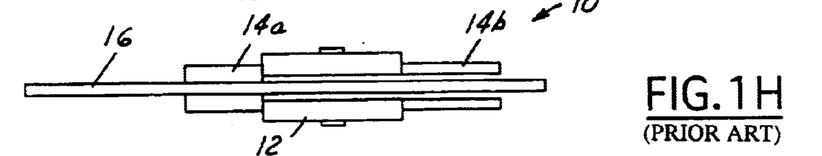

In FIG. 1A, system 10 is off and each of actuators 12, 14a, and 14b, are opened and disengaged from shaft 16. In FIG. 1B, left clamping actuator 14a closes and clamps onto shaft 16. This is a representation of the clamping function. In FIG. 1C, central actuator 12 compresses towards shaft 16 and extends thereby moving left clamping actuator 14a with the shaft in the left direction. This is a representation of the length changing function. In FIG. 1D, right clamping actuator 14b closes and clamps onto shaft. In FIG. 1E, left clamping actuator 14a opens and disengages shaft 16. In FIG. 1F, central actuator 12 contracts and shaft 16 moves further in the left direction. In FIG. 1G, left clamping actuator 14a closes and clamps onto shaft 16. In FIG. 1H, the process starts to repeat with right clamping actuator 14b opening and disengaging shaft 16.

System 10 has a very simple design that uses only piezoelectric actuation. Depending upon the electrical input sequence, shaft 16 may be moved in either direction at variable speeds. However, in addition to the other disadvantages noted above, the lack of a self locking state (in the absence of power) is undesirable.

Magnetostriction inchworm linear motion systems use magnetic fields to move special types of metal having magnetostrictive properties. Magnetostriction is the phenomenon in which magnetic energy is transferred into mechanical energy and vice versa. In the first case, known as the Joule effect, magnetostrictive materials change shape in response to a changing magnetic field. The Joule effect is used mainly in actuators where motion or force is the desired outcome. As most devices couple electric and magnetic energy (for example, using electric current with changing magnetic field), magnetostrictive motion systems are really electromagneto-mechanical devices.

The basic physical operation of magnetostriction is as follows. When no magnetic field is applied the domains that make up the molecular structure of magnetostrictive materials are disorganized. Upon exposure to a magnetic field, the domains rotate and align with the magnetic field. The reorientation of the molecular domains causes geometric distortion on the macroscopic level thereby elongating the material along the direction of the magnetic field. As the magnetic field gets stronger, more domains get aligned and greater elongation is achieved.

The main components of a magnetostriction inchworm linear motion system include a magnetostrictive rod and a metal cylindrical housing around which induction coils are wound. The rod inches up and down by stretching and pushing against the sides of the housing. The limiting factor for use of magnetostrictive alloys is cost as these alloys are made from expensive rare earth elements. Accordingly, magnetostriction inchworm linear motion systems are uneconomical to incorporate in the mass assembly of vehicles.

SUMMARY OF THE INVENTION

It is an object of the present invention to provide a vehicle seat drive having a mechanical inchworm linear motion actuator for driving a vehicle seat.

It is another object of the present invention to provide a vehicle seat drive having an actuation module and a jamming module for performing length changing and clamping functions to drive a vehicle seat.

It is a further object of the present invention to provide a vehicle seat assembly having a vehicle seat drive including a mechanical inchworm linear motion actuator.

In carrying out the above objects and the other objects, the present invention provides a vehicle seat drive having a linearly movable shaft coupled to the vehicle seat such that the vehicle seat moves as the shaft moves. The vehicle seat drive further includes a jamming module having left and right jamming plates operable for engaging and disengaging the shaft while moving linearly with respect to the shaft. The vehicle seat drive also includes an actuation module operable for applying linear forces on the jamming plates to have the jamming plates engage and disengage the shaft and move linearly with respect to the shaft. The actuation module applies a first linear force in the left direction on the left jamming plate to have the left jamming plate engage and move the shaft in the left direction thereby moving the vehicle seat to the left.

Further, in carrying out the above objects and other objects, the present invention provides a vehicle seat assembly having a vehicle seat and a linearly movable shaft coupled to the vehicle seat such that the vehicle seat moves as the shaft moves. The vehicle seat assembly further includes a jamming module having left and right jamming plates operable for engaging and disengaging the shaft while moving linearly with respect to the shaft. The vehicle seat assembly also includes an actuation module operable for applying linear forces on the jamming plates to have the jamming plates engage and disengage the shaft and move linearly with respect to the shaft. The actuation module applies a first linear force in a first linear direction on one of the jamming plates to have the one of the jamming plates engage and move the shaft in the first linear direction thereby moving the vehicle seat in the first linear direction.

Also, in carrying out the above objects and other objects, the present invention provides a vehicle seat drive for driving a vehicle seat between fore and aft positions. The vehicle seat drive includes an actuation module having a motor, a rotatable shaft, and a wobble plate. The motor is coupled to the rotatable shaft to rotatably drive the rotatable shaft. The wobble plate is coupled to the rotatable shaft to rotate with the rotatable shaft such that a fixed point of the wobble plate has lateral motion as the rotatable shaft rotates. The fixed wobble plate point generates a first linear force during a first rotatable revolution portion and removes the first linear force during a second rotatable revolution portion while rotating. The vehicle seat drive further includes a jamming module having left and right movable jamming plates and a movable shaft. The movable shaft extends through the jamming plates such that the jamming plates are locked to the movable shaft in a biased configuration. The movable shaft is coupled to a vehicle seat such that the vehicle seat moves as the movable shaft moves.

The fixed wobble plate point engages one of the jamming plates as the fixed wobble plate point moves in a first linear direction and provides the first linear force during the first rotatable revolution portion on the one of the jamming plates causing the movable shaft and the jamming plates to move in the first linear direction while causing the other one of the jamming plates to unlock from the movable shaft thereby moving the vehicle seat in the first linear direction. The fixed wobble plate point removes the first linear force during the second rotatable revolution portion from the one of the jamming plates causing the jamming plates to move back to the biased configuration.

Still further, in carrying out the above objects and other objects, the present invention provides a vehicle seat drive for driving a vehicle seat. The vehicle seat drive includes a shaft, a jamming module, and an actuation module. The jamming module includes left and right jamming plates operable for engaging and disengaging the shaft while moving linearly with respect to the shaft. The jamming plates are biased in a biased configuration to engage the shaft and are coupled to the vehicle seat such that the vehicle seat moves as the r jamming plates move. The actuation module includes first and second pairs of push solenoids operable for applying linear forces on the jamming plates to have the jamming plates engage and disengage the shaft and move linearly with respect to the shaft. The first pair of solenoids applies a first linear force in a first linear direction on one of the jamming plates to have the one of the jamming plates move along the shaft in the first linear direction thereby moving the other one of the jamming plates and the vehicle seat in the first linear direction. The second pair of solenoids applies a second linear force in an opposed second linear direction on the other one of the jamming plates to have the other one of the jamming plates move the along the shaft in the second linear direction thereby moving the one jamming plate and the vehicle seat in the second linear direction.

The above objects and other objects, features, and advantages of the present invention are readily apparent from the following detailed description of the detailed description of the preferred embodiment(s) when taken in connection with the accompanying drawings.

DETAILED DESCRIPTION OF THE PREFERRED EMBODIMENT(S)

Figure 2:
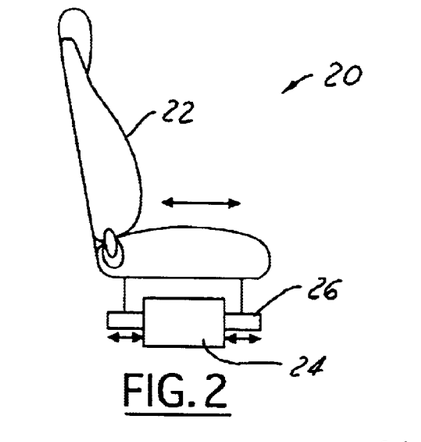
FIG. 2 illustrates a vehicle seat assembly in accordance with the present invention.

Referring now to FIG. 2, a vehicle seat assembly 20 in accordance with the present invention is shown. Vehicle seat assembly 20 includes a vehicle seat 22 and a vehicle seat drive 24. Vehicle seat drive 24 includes a mechanical inchworm linear actuation system having a shaft 26. Shaft 26 is coupled at each end to vehicle seat 22. Vehicle seat drive 24 is operable to move shaft 26 in an inchworm like motion between fore and aft positions. As shaft 26 is coupled to vehicle seat 22, the vehicle seat moves between fore and aft positions as the shaft moves. Vehicle seat assembly 20 may include an additional vehicle seat drive such that the shaft of one vehicle seat drive is coupled to one side of vehicle seat 22 and the shaft of the other vehicle seat drive is coupled to the other side of the seat with the shafts being in parallel to one another.

Figure 3:
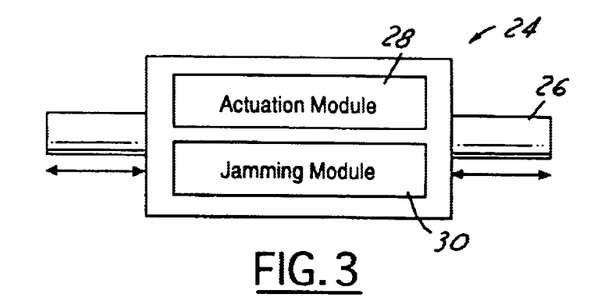
FIG. 3 illustrates a detailed block diagram of the vehicle seat drive of the vehicle seat assembly.

Referring now to FIG. 3, a more detailed block diagram of vehicle seat drive 24 is shown. Vehicle seat drive 24 performs inchworm motion by using clamping and length changing elements described above with reference to FIG.

1A through FIG. 1H for performing clamping and length changing functions. Vehicle seat drive 24 includes an actuation module 28 for performing the length changing function and a jamming module 30 for performing the clamping function.

Figure 4A:
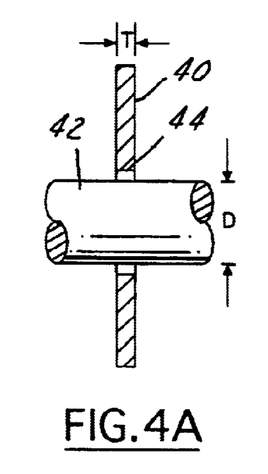
FIGS. 4A and 4B illustrate the jamming principle used by the jamming module of the vehicle seat drive.
Figure 4B:
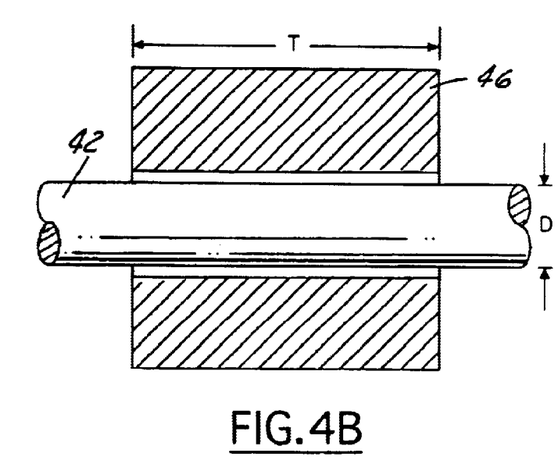

Jamming module 30 includes elements which use the jamming principle to perform the clamping function. With reference to FIGS. 4A and 4B, the jamming principle, as applied to sliding elements, occurs when additional degrees of freedom are introduced into what is intended to be a single degree of freedom motion. FIG. 4A illustrates the condition under which jamming between a sliding element (thin jamming plate) 40 and a shaft 42 will occur. The small thickness (T) to diameter (D) ratio makes it easy for jamming plate 40 to tilt and jam against shaft 42 with its sharp edge 44. The rule of thumb for a smooth sliding action is to have T:D to be greater than two (assuming that the bore clearance of the sliding element is small). This is demonstrated in FIG. 4B where T:D of sliding element 46 to shaft 42 is much greater than two allowing for smooth sliding.

Figure 5A:
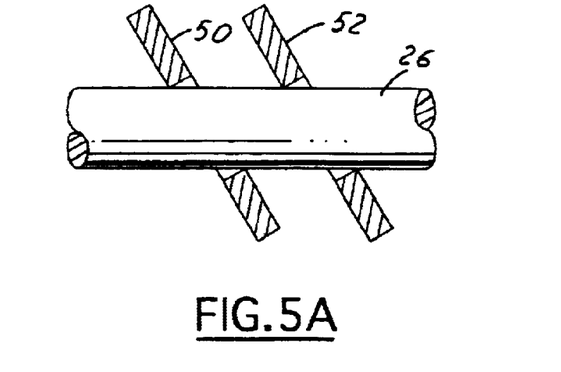
FIGS. 5A and 5B illustrate two possible orientations of the jamming plates of the jamming module of the vehicle seat drive.
Figure 5B:
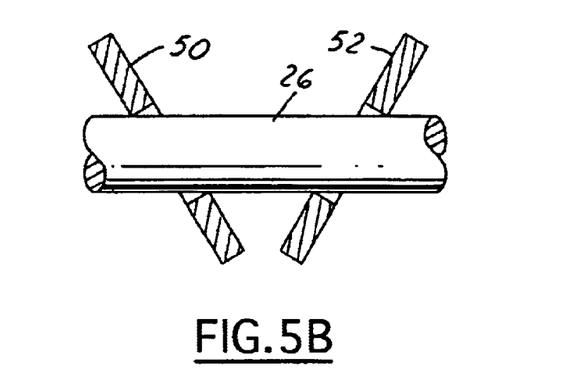

With reference to FIGS. 5A and 5B, when using two jamming plates 50 and 52 against shaft 26 there exists infinite possible plate to plate orientations. If both jamming plates 50 and 52 are to be aligned such that the point of jamming occurs on the same plane, the jamming plates can either be tilted in the same direction (parallel) as shown in FIG. 5A or away from each other in a "v" shape as shown in FIG. 5B. Jamming module 30 of vehicle seat drive 24 uses two jamming plates 50 and 52 configured in the "v" shape on shaft 26.

Figure 6A:
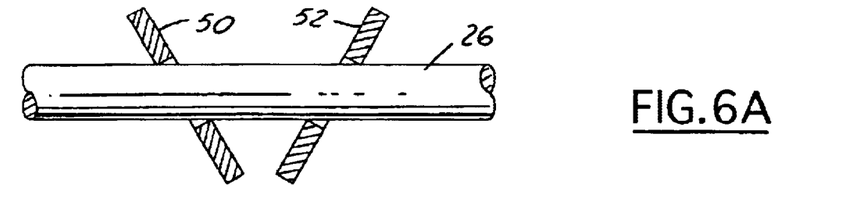
FIGS. 6A through 6F illustrate the motion sequence of the jamming plates of the jamming module of the vehicle seat drive.
Figure 6B:
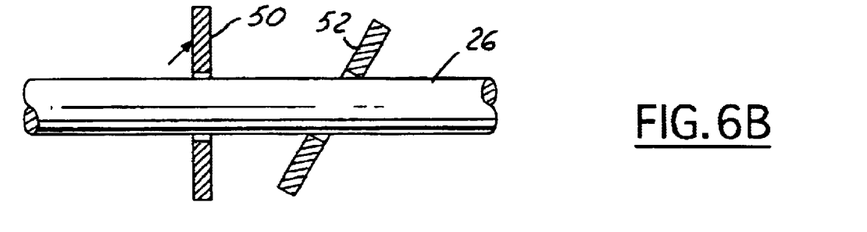

The motion sequence of jamming plates 50 and 52 of vehicle seat drive 24 during operation for moving shaft 26 to the right is illustrated in FIGS. 6A through 6F. In FIG. 6A, both jamming plates 50 and 52 are clamped down on shaft 26 and are in a locked configuration. In FIG. 6B, jamming plate 50 is driven by a force causing jamming plate 50 to disengage shaft 26 and be moved from the tilted position to a perpendicular position with respect to the shaft.

Figure 6C:
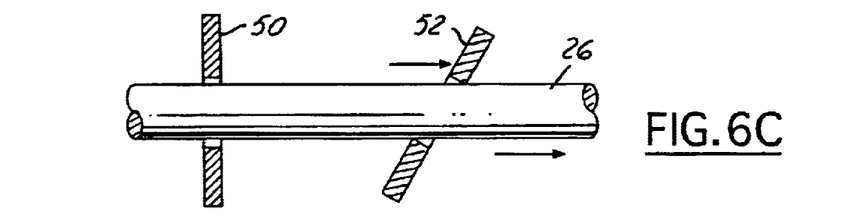
Figure 6D:
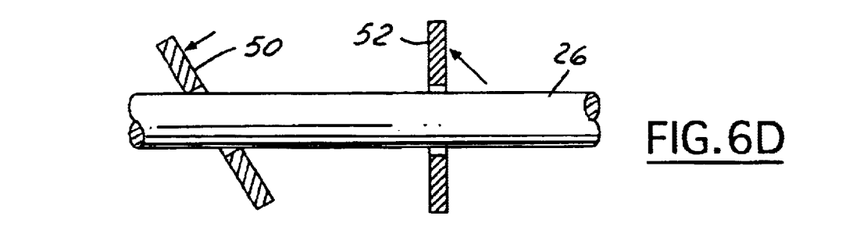

In FIG. 6C, jamming plate 52 is driven by a force to move to the right. As jamming plate 52 is clamped on shaft 26, the movement of jamming plate 52 to the right causes the shaft to also move to the right (i.e., length changing function). In FIG. 6D, jamming plate 50 is driven by a force to tilt and clamp down on shaft 26 while jamming plate 52 is driven by a force causing jamming plate 52 to disengage the shaft and be moved from the tilted position to a perpendicular position with respect to the shaft.

Figure 6E:
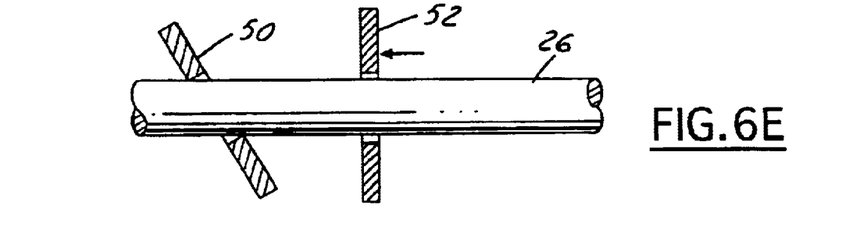
Figure 6F:
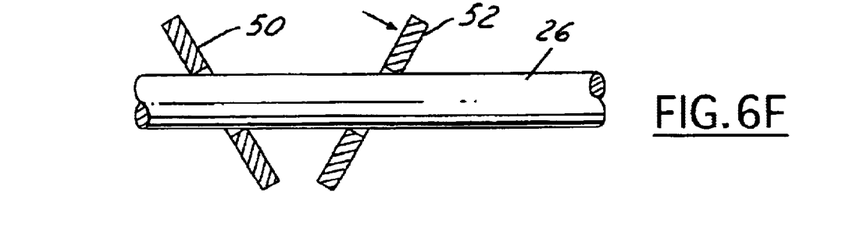

In FIG. 6E, jamming plate 52 is driven by a force to move to the left. As jamming plate 52 is disengaged with shaft 26, the movement of jamming plate 52 towards the left does not cause shaft to move. In FIG. 6F, jamming plate 52 is driven by a force to tilt and clamp down on shaft 26 such that both jamming plates 50 and 52 are clamped down on the shaft and are in the locked configuration (i.e., clamping function). Actuation module 28 of vehicle seat drive 24 provides forces to move jamming plates 50 and 52 in order to perform the clamping and length changing functions. Jamming plates 50 and 52 are also operable to move shaft 26 to the left in a like manner.

Figure 7:
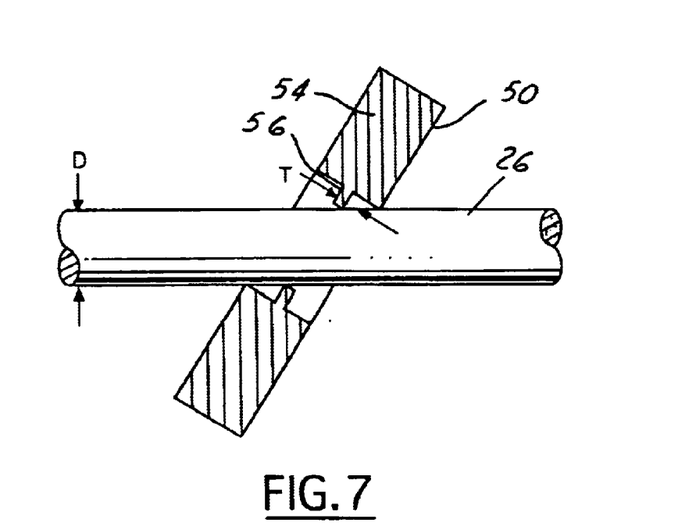
FIG. 7 illustrates a detailed illustration of a jamming plate and a shaft of the vehicle seat drive.

Referring now to FIG. 7, a more detailed illustration of jamming plate 50 (or 52) and shaft 26 is shown. Jamming plate 50 includes a body 54 and a tab 56. Tab 56 engages shaft 26 when jamming plate 50 is clamped down on the shaft. Tab 56 is thin such that a small T:D ratio and the corresponding jamming capability of jamming plate 50 is maintained. Body 54 is relatively thick to provide structural soundness.

Figure 8:
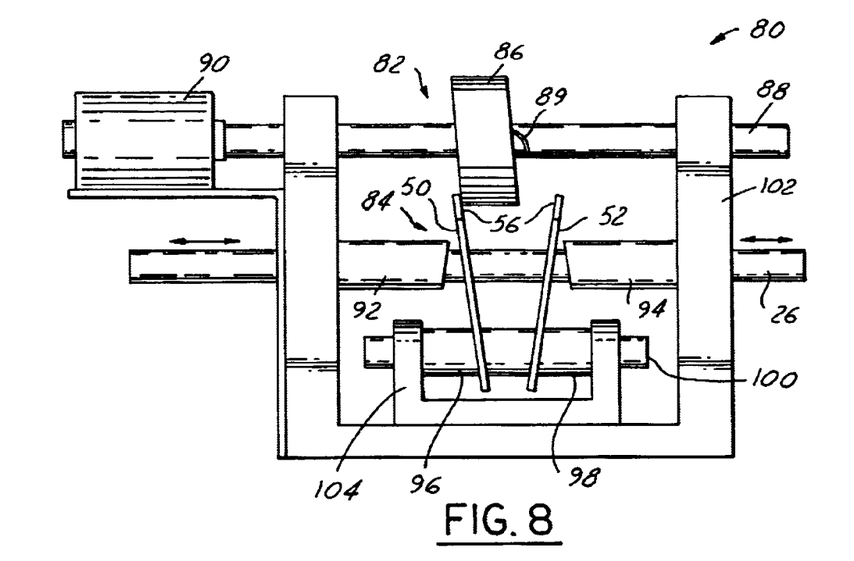
FIGS. 8 and 9 illustrate a vehicle seat drive in accordance with a first embodiment of the present invention.
Figure 9:
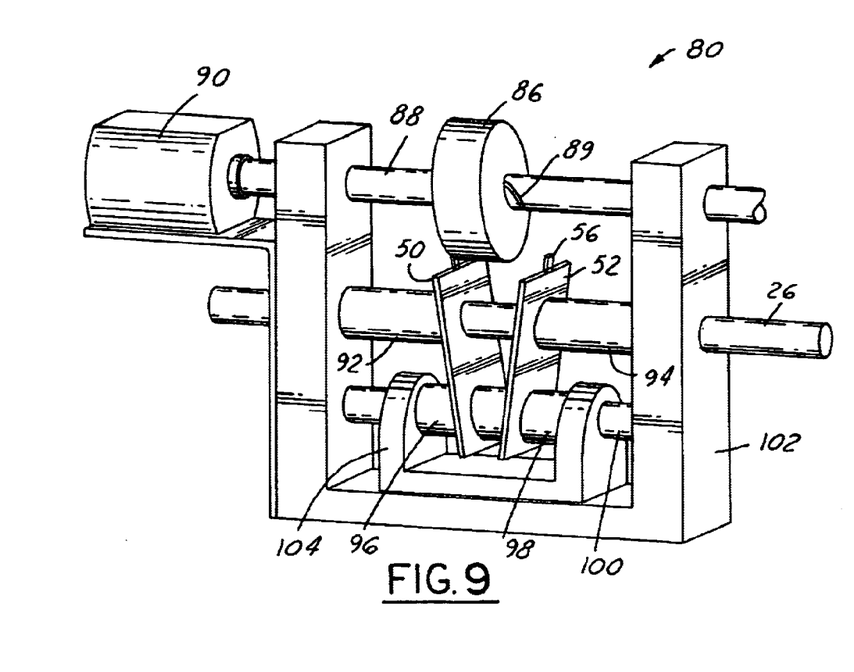

Referring now to FIGS. 8 and 9, a vehicle seat drive 80 in accordance with a first embodiment of the present invention is shown. Vehicle seat drive 80 includes a mechanical inchworm linear actuation system having an actuation module 82 and a jamming module 84. Actuation module 82 includes a wobble plate 86, a shaft 88, and a bi-directional motor 90. Shaft 88 includes a helical groove 89 upon which a tooth of wobble plate 86 slides during rotation of shaft 88. Jamming module 84 includes left and right jamming plates 50 and 52, a driven shaft 26, four rubber spring-like sleeves 92, 94, 96, and 98, and a mounting shaft 100. Shafts 26 and 88 extend through each end of a main base 102. Shaft 100 extends through each end of a jamming plate base 104 mounted on main base 102 within each side of the main base.

Shaft 26 extends through aligned holes in the middle portions of jamming plates 50 and 52. Mounting shaft 100 extends through aligned holes in the lower portion of jamming plates 50 and 52. As shown in FIGS. 8 and 9, jamming plates 50 and 52 are tilted in a "v" configuration and clamped to shaft 26. Spring like sleeves 92 and 94 are positioned around shaft 26 between jamming plates 50 and 52 and respective ends of main base 102. Spring like sleeves 96 and 98 are positioned around mounting shaft 100 between jamming plates 50 and 52 and respective ends of jamming plate base 104. The bottom portions of jamming plates 50 and 52 may be connected together by an additional spring which pulls the bottom portions of jamming plates together to create a strong locking effect. Spring-like sleeves 96 and 98 maintain jamming plate orientation by tilting the plates away from each other. Sleeves 96 and 98 essentially act like springs, restoring jamming plates 50 and 52 to their stable locked and clamped positions when the system is off as shown in FIGS. 8 and 9.

In operation, motor 90 drives shaft 88 to rotate in either a clockwise or counter-clockwise direction. As shaft 88 rotates, wobble plate 86 rotates and linearly glides along groove 89 such that a fixed point of the wobble plate has lateral motion thereby creating linear back and forth motion. When shaft 88 is rotated clockwise, wobble plate 86 glides along groove 89 toward the left and activates jamming plate 50 forcing jamming plate 50 to move to the left. When shaft 88 is rotated counter-clockwise, wobble plate 86 glides along groove 89 toward the right and activates jamming plate 52 forcing jamming plate 52 to move to the right. Groove 89 and the direction of rotation of shaft 26 determine which jamming plate wobble plate 86 activates.

In the position shown in FIG. 8, as shaft 88 rotates clockwise (as seen from the right), wobble plate 86 shifts to jamming plate 52. When shaft 88 changes direction and turns counter clockwise, wobble plate 86 disengages jamming plate 52 and shifts to jamming plate 50. This action of shifting from either side is accomplished by the sliding of wobble plate 86 along groove 89. Wobble plate 86 slides along groove 89 via a bearing or a tooth on the wobble plate. The length of travel by wobble plate 86 is limited by the length of groove 89.

As wobble plate 86 rotates while activating a jamming plate 50 and 52, the fixed wobble plate point transfers a linear back and forth pushing force on the activated jamming plate. For instance, when wobble plate 86 activates left jamming plate 50 the fixed wobble plate point provides a left linear pushing force on the left jamming plate during a first part of its rotational revolution and then removes the left linear pushing force on the left jamming plate during the remaining part of its rotational revolution. This process is repeated for each rotational revolution of wobble plate 86.

In operation, as shaft 88 and wobble plate 86 rotate clockwise, the wobble plate glides along groove 89 toward the left until it activates left jamming plate 50. At this point, the fixed point of wobble plate 86 provides a left linear pushing force on left jamming plate 50 during a first part of its rotational revolution. In response to the left linear pushing force, the left jamming plate moves linearly toward the left. As left and right jamming plates 50 and 52 are clamped to shaft 26 the shaft and the jamming plates also move linearly toward the left. As a result of moving to the left, left jamming plate 50 continues to clamp on shaft 26 while right jamming plate 52 moves from the tilted clamped configuration to the perpendicular unlocked configuration with respect to shaft 26. Shaft 26 is coupled to vehicle seat 22 which causes the vehicle seat to move to the left, i.e., aft position.

The left linear pushing force on left jamming plate 50 provided by the fixed point of wobble plate 89 is then removed during the second part of the rotational revolution of the wobble plate. At this point, spring-like sleeve 92 provides a restoring force on left jamming plate 50. In response to the restoring force, left jamming plate 50 shifts back to its starting position as shown in FIGS. 8 and 9. Similarly, sleeve 98 provides a restoring force on right jamming plate 52. In response to this restoring force, right jamming plate 52 shifts back to its starting position as shown in FIGS. 8 and 9. The process is then repeated and, as a result, shaft 26 and vehicle seat 22 move towards the left in an inchworm like fashion.

As shaft 88 and wobble plate 86 rotate counter-clockwise, the wobble plate glides along groove 89 toward the right until it activates right jamming plate 52. At this point, the fixed point of wobble plate 86 provides a right linear pushing force on right jamming plate 52 during a first part of its rotational revolution. In response to the right linear pushing force, the right jamming plate moves linearly toward the right. As left and right jamming plates 50 and 52 are clamped to shaft 26, the shaft and the jamming plates also move linearly toward the right. As a result of moving to the right, right jamming plate 52 continues to clamp on shaft 26 while left jamming plate 50 moves from the tilted clamped configuration to the perpendicular unlocked configuration with respect to shaft 26. Shaft 26 is coupled to vehicle seat 22 which causes the vehicle seat to move to the right, i.e., fore position.

The right linear pushing force on right jamming plate 52 provided by the fixed point of wobble plate 86 is then removed during the second part of the rotational revolution of the wobble plate. At this point, spring-like sleeve 94 provides a restoring force on right jamming plate 52. In response to the restoring force, right jamming plate 52 shifts back to its starting position as shown in FIGS. 8 and 9. Similarly, sleeve 96 provides a restoring force on left jamming plate 50. In response to this restoring force, left jamming plate 50 shifts back to its starting position as shown in FIGS. 8 and 9. The process is then repeated and, as a result, shaft 26 (and vehicle seat 22) moves towards the right in an inchworm like fashion.

Figure 10:
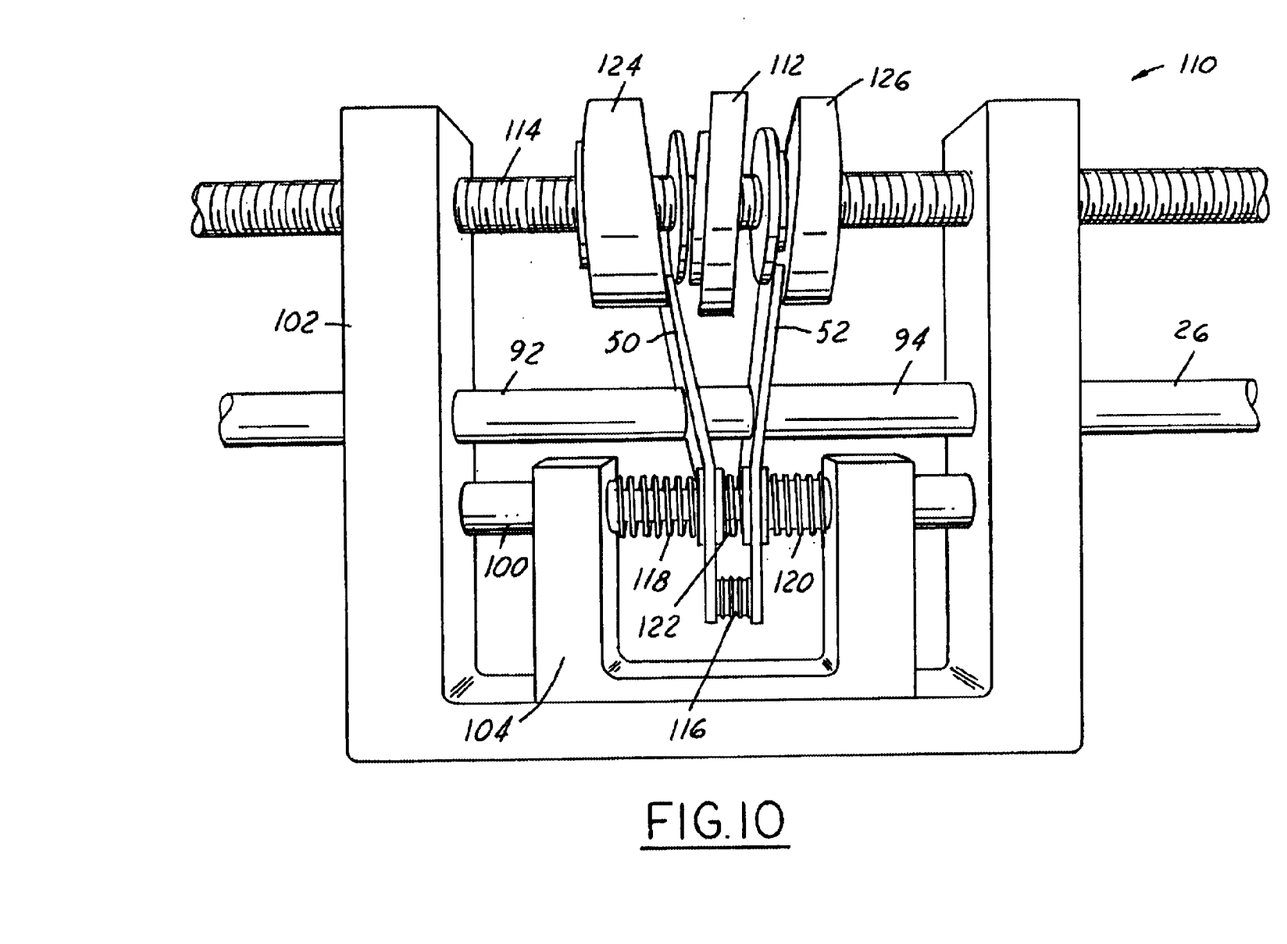
FIG. 10 illustrates a vehicle seat drive in accordance with a second embodiment of the present invention.

Referring now to FIG. 10, a vehicle seat drive 110 in accordance with a second embodiment of the present invention is shown. The actuation module of vehicle seat drive 110 generally differs from actuation module 82 of vehicle seat drive 80 in that a threaded shaft 114 replaces grooved shaft 88 and a wobble plate 112 having tapped threads replaces wobble plate 86 with its tooth. Further, instead of spring-like sleeves, the jamming module of vehicle seat drive 110 includes compression springs 118 and 120 positioned around mounting shaft 100 between jamming plates 50 and 52 and the respective sides of jamming plate base 104. A compression spring 122 is positioned around mounting shaft 100 between jamming plates 50 and 52. A tension spring 116 connects the lower portions of jamming plates 50 and 52.

The actuation module of vehicle seat drive 110 further includes left and right end plates 124 and 126 positioned around shaft 114 on respective sides of wobble plate 112. End plates 124 and 126 limit the travel of wobble plate 112 and kick open respective jamming plates 50 and 52 during the return stroke. As wobble plate 112 rotates and activates a jamming plate 50 and 52, the jamming plate shifts and moves shaft 26. During the return stroke of jamming plates 50 and 52, a knob on the end of the respective end plate 124 and 126 tilts the jamming plate and unlocks it from shaft 26 with assistance from spring-like sleeves 92 and 94. This allows jamming plates 50 and 52 to shift back to their original position and begin the motion sequence again. This sequence happens once every full rotational revolution of wobble plate 112.

Figure 11:
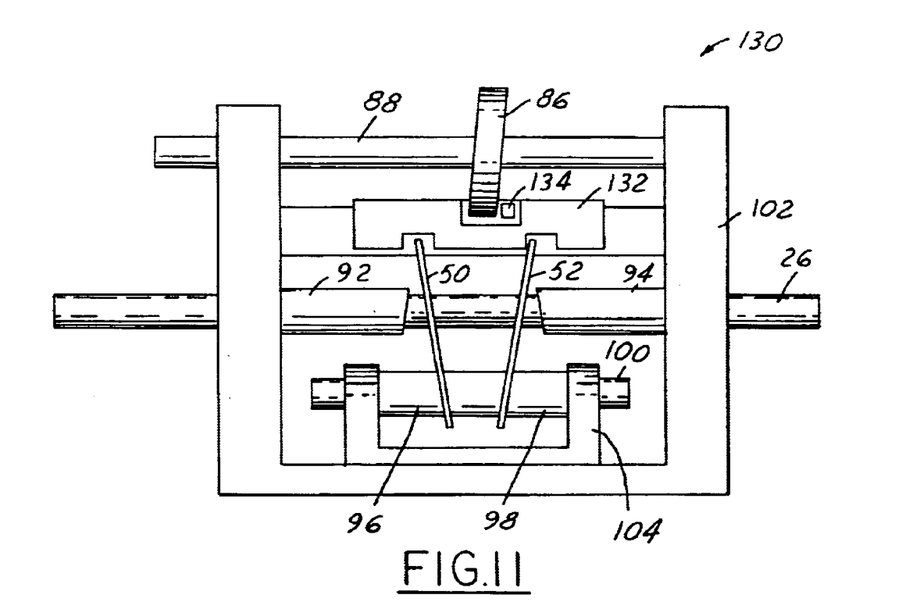
FIG. 11 illustrates a vehicle seat drive in accordance with a third embodiment of the present invention.

Referring now to FIG. 11, a vehicle seat drive 130 in accordance with a third embodiment of the present invention is shown. The actuation module of vehicle seat drive 130 generally differs from actuation module 28 of vehicle seat drive 80 in that a plate actuation guide 132 is provided. Plate actuation guide 132 allows for shifting of actuation direction without the use of a grooved shaft nor end plates. Plate actuation guide 132 is driven above by wobble plate 86 and contacts jamming plates 50 and 52 below. Depending on the direction in which wobble plate 86 rotates, plate actuation guide 132 engages either left or right jamming plates 50 and 52.

Figure 12:
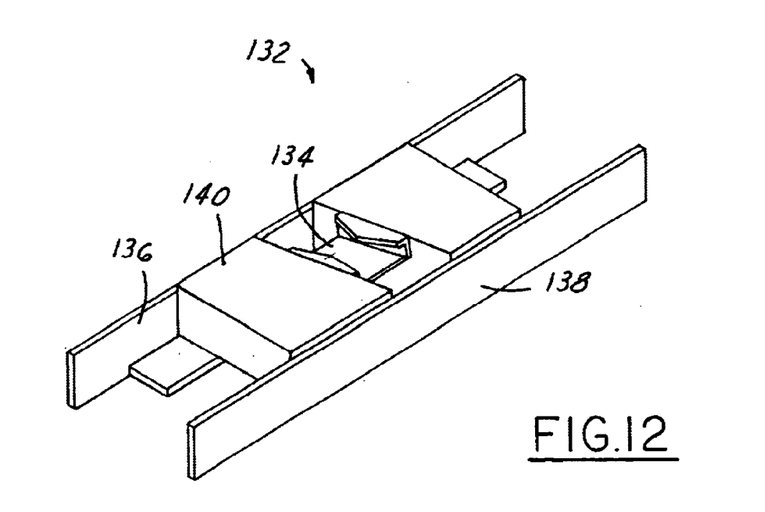
FIG. 12 illustrates a plate actuation guide of the vehicle seat drive illustrated in FIG. 11.

With reference to FIG. 12, plate actuation guide 132 includes a sliding knob 134 which is in constant contact with wobble plate 86. When wobble plate 86 changes direction, knob 134 slides along a groove in the direction that the wobble plate is rotating and stops at brackets 136 or 138. When knob 134 is sliding it pushes a sliding plate 140 so that it engages a jamming plate 50 or 52. Further rotation by wobble plate 86 shifts sliding plate 140 forward and advances the respective jamming plate 50 or 52 and shaft 26. The return stroke of the respective jamming plate 50 or 52 is provided by the respective spring-like sleeve 92 or 94.

Accordingly, with the addition of plate actuation guide 132, direction change is accomplished simply by changing the rotational direction of wobble plate 86. By virtue of friction, sliding knob 134 shifts with rotation of wobble plate 86 and pushes sliding plate 140 along brackets 136 and 138 to engage the opposite jamming plate.

Figure 13:
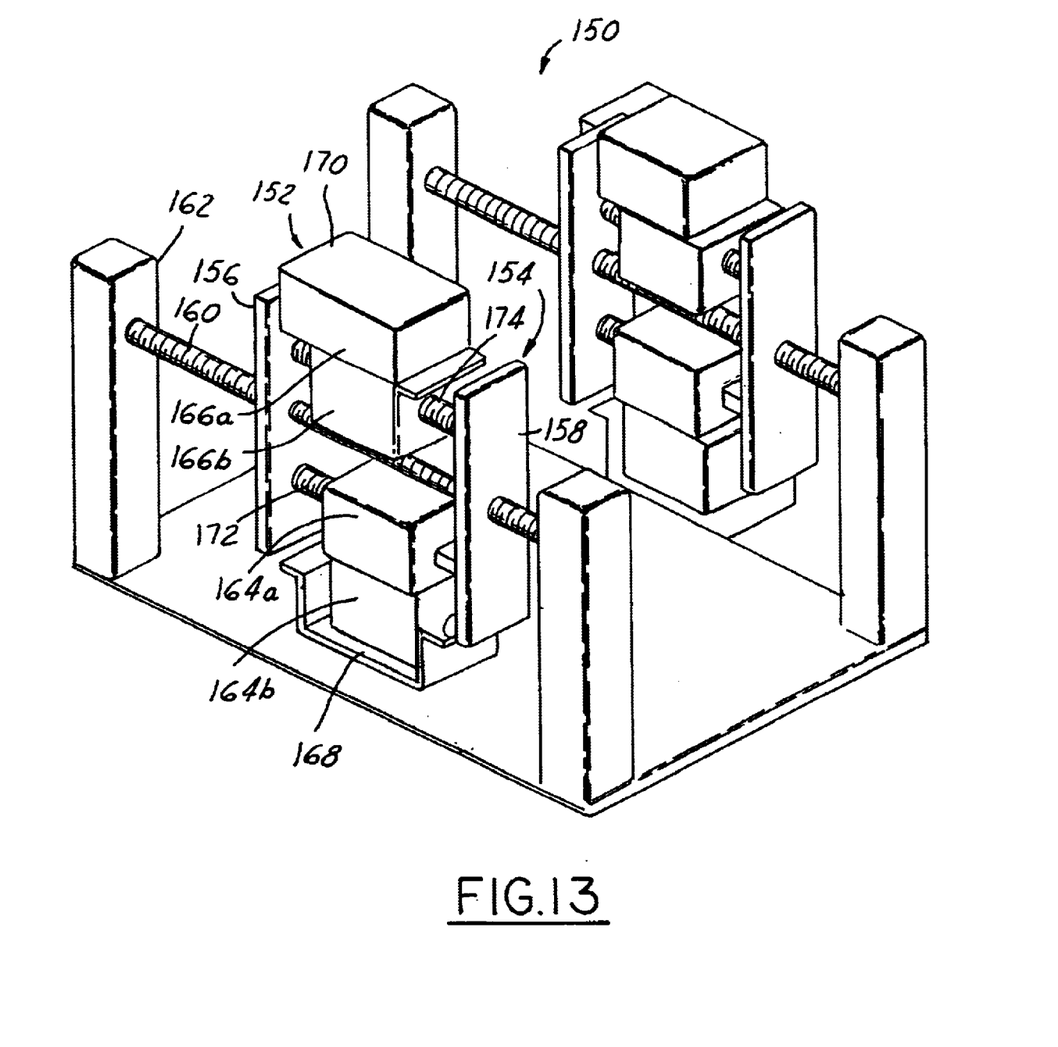
FIG. 13 illustrates a vehicle seat drive in accordance with a fourth embodiment of the present invention.

Referring now to FIG. 13, a vehicle drive system 150 in accordance with a fourth embodiment of the present invention is shown. Vehicle drive system 150 includes an actuation module 152 and a jamming module 154. Actuation module 152 and jamming module 154 are coupled to a respective side of a vehicle seat to provide fore and aft movement to the vehicle seat. Another actuation module and jamming module are coupled to the other side of the vehicle seat to provide fore and aft movement to the vehicle seat.

Jamming module 154 includes left and right jamming plates 156 and 158 with a shaft 160 extending through respective holes of the jamming plates. Shaft 160 is connected at each end to a vehicle seat base 162. Actuation module 152 includes first pair of push solenoids 164a and 164b; and a second pair of push solenoids 166a and 166b. A bracket 168 is connected to solenoid 164b and a bracket 170 is connected to solenoid 166a. A shaft 172 in parallel with shaft 162 extends through solenoid 164a and is connected at each end to jamming plates 156 and 158. A shaft 174 in parallel with shaft 162 extends through solenoid 166b and is connected at each end to jamming plates 156 and 158.

In operation, solenoids 164 and 166 are actuated to move along corresponding shafts 172 and 174 to enable brackets 168 and 170 to actuate jamming plates 156 and 158 such that the jamming plates jam on shaft 160 and then drag solenoids forwards or backwards. This motion is continued in a cyclic manner that allows actuation module 152 and jamming module 154 to inch along shaft 160. Solenoid pairs 164 and 166 act independently of each other. For example, the top pair of solenoids 166 drive the vehicle seat forward while the bottom pair of solenoids 164 drive the vehicle seat backward.

The solenoid actuation sequence of vehicle seat drive 150 is as follows. In order to move the vehicle seat to the right, solenoid 166b pulls causing jamming plate 158 to jam and jamming plate 156 to move right. Then solenoid 166a pulls causing jamming plate 158 to move right and jamming plate 156 to jam. This process is repeated in order to move the vehicle seat farther right.

In order to move the vehicle seat to the left, solenoid 164a pulls causing jamming plate 158 to move left and jamming plate 156 to jam. Then solenoid 166b pulls causing jamming plate 158 to jam and jamming plate 156 to move left. This process is repeated in order to move the vehicle seat farther left.

Thus it is apparent that there has been provided, in accordance with the present invention, a vehicle seat drive having a mechanical inchworm linear motion actuator for driving a vehicle seat that fully satisfies the objects, aims, and advantages set forth above. The mechanical inchworm linear motion actuator operates via sequential locking/unlocking and extending/contracting motions. While the present invention has been described in conjunction with specific embodiments thereof, it is evident that many alternatives, modifications, and variations will be apparent to those skilled in the art in light of the foregoing description. Accordingly, it is intended to embrace all such alternatives.

What is claimed is:

1. A vehicle seat drive comprising:
   a linearly movable shaft coupled to the vehicle seat such that the vehicle seat moves as the shaft moves;
   a jamming module having left and right jamming plates operable for engaging and disengaging the shaft while moving linearly with respect to the shaft; and
   an actuation module operable for applying linear forces on the jamming plates to have the jamming plates engage and disengage the shaft and move linearly with respect to the shaft, wherein the actuation module applies a first linear force in the left direction on the left jamming plate to have the left jamming plate engage and move the shaft in the left direction thereby moving the vehicle seat to the left.

2. The vehicle seat drive of claim 1 wherein:
   the actuation module applies a second linear force in the right direction on the right jamming plate to have the right jamming plate engage and move the shaft in the right direction thereby moving the vehicle seat to the right.

3. The vehicle seat drive of claim 2 wherein:
   the actuation module removes the second linear force on the right jamming plate to have the right jamming plate disengage the shaft and then reapplies the second linear force on the right jamming plate to have the right jamming plate engage and further move the shaft in the right direction thereby further moving the vehicle seat to the right.

4. The vehicle seat drive of claim 1 wherein:
   the actuation module removes the first linear force on the left jamming plate to have the left jamming plate disengage the shaft and then reapplies the first linear force on the left jamming plate to have the left jamming plate engage and further move the shaft in the left direction thereby further moving the vehicle seat to the left.

5. The vehicle seat drive of claim 1 wherein:
   the actuation module includes a motor, a rotatable shaft, and a wobble plate, wherein the motor is coupled to the rotatable shaft to rotatably drive the rotatable shaft, wherein the wobble plate is coupled to the rotatable shaft to rotate such that a fixed point of the wobble plate moves left and right as the rotatable shaft rotates, wherein the wobble plate applies the linear forces on the left and right jamming plates.

6. The vehicle seat drive of claim 1 wherein:
   the actuation module includes first and second pairs of push solenoids, wherein the push solenoids are operable to apply the linear forces on the left and right jamming plates.

7. A vehicle seat assembly comprising:
   a vehicle seat;
   a linearly movable shaft coupled to the vehicle seat such that the vehicle seat moves as the shaft moves;
   a jamming module having left and right jamming plates operable for engaging and disengaging the shaft while moving linearly with respect to the shaft; and
   an actuation module operable for applying linear forces on the jamming plates to have the jamming plates engage and disengage the shaft and move linearly with respect to the shaft, wherein the actuation module applies a first linear force in a first linear direction on one of the jamming plates to have the one of the jamming plates engage and move the shaft in the first linear direction thereby moving the vehicle seat in the first linear direction.

8. The vehicle seat assembly of claim 7 wherein:
   the actuation module applies a second linear force in an opposed second linear direction on the other one of the jamming plates to have the other one of the jamming plates engage and move the shaft in the second linear direction thereby moving the vehicle seat in the second linear direction.

9. A vehicle seat drive for driving a vehicle seat between fore and aft positions, the vehicle seat drive comprising:
   an actuation module having a motor, a rotatable shaft, and a wobble plate, wherein the motor is coupled to the rotatable shaft to rotatably drive the rotatable shaft, wherein the wobble plate is coupled to the rotatable shaft to rotate with the rotatable shaft such that a fixed point of the wobble slate moves linearly back and forth in first and second linear directions along the rotatable shaft as the rotatable shaft rotates, wherein the wobble plate generates a linear back and forth pushing force while rotating;
   a jamming module having left and right movable jamming plates and a movable shaft, wherein the movable shaft extends through the jamming plates such that the jamming plates are locked to the movable shaft in a biased configuration, wherein the movable shaft is coupled to a vehicle seat such that the vehicle seat moves as the movable shaft moves;

wherein the wobble plate engages one of the jamming plates as the fixed point of the wobble plate moves in the first linear direction and provides the pushing force on the one of the jamming plates causing the movable shaft and the jamming plates to move in the first linear direction while causing the other one of the jamming plates to unlock from the movable shaft thereby moving the vehicle seat in the first linear direction, wherein the wobble plate disengages the one of the jamming plates as the fixed point of the wobble plate moves in the second linear direction and removes the pushing force from the one of the jamming plates causing the jamming plates to move back to the biased configuration.

10. The vehicle seat drive of claim 9 wherein:

the fixed point of the wobble plate engages the left jamming plate as the fixed point of the wobble plate moves left and provides the pushing force on the left jamming plate causing the movable shaft and the jamming plates to move to the left while causing the right jamming plate to unlock from the movable shaft thereby moving the vehicle seat to the left, wherein the fixed point of the wobble plate removes the pushing force from the left jamming plate causing the jamming plates to move back to the biased configuration.

11. The vehicle seat drive of claim 9 wherein:

the fixed point of the wobble plate engages the right jamming plate as the fixed point of the wobble plate moves right and provides the pushing force on the right jamming plate causing the movable shaft and the jamming plates to move to the right while causing the left jamming plate to unlock from the movable shaft thereby moving the vehicle seat to the right, wherein the fixed point of the wobble plate removes the pushing force from the right jamming plate causing the jamming plates to move back to the biased configuration.

12. The vehicle seat drive of claim 9 wherein:

the rotatable shaft has a helical groove and the wobble plate has a tooth which glides along the helical groove as the rotatable shaft rotates.

13. The vehicle seat drive of claim 9 wherein:

the rotatable shaft is a threaded shaft and the wobble plate includes tapped threads.

14. The vehicle seat drive of claim 9 wherein:

the actuation module includes an end plate coupled to the rotatable shaft on each side of the wobble plate for moving the jamming plates back to the biased configuration.

15. The vehicle seat drive of claim 9 wherein:

the actuation module includes a plate actuation guide operable with the wobble plate to change the direction of the wobble plate as the wobble plate moves linearly along the rotatable shaft.

16. A vehicle seat assembly comprising:

a vehicle seat;

a vehicle seat drive including a shaft, a jamming module, and an actuation module;

the jamming module having left and right jamming plates operable for engaging and disengaging the shaft while moving linearly with respect to the shaft, wherein the jamming plates are biased in a biased configuration to engage the shaft and are coupled to the vehicle seat such that the vehicle seat moves as the jamming plates move; and the actuation module having first and second pairs of push solenoids operable for applying linear forces on the jamming plates to have the jamming plates engage and disengage the shaft and move linearly with respect to the shaft, wherein the first pair of solenoids applies a first linear force in a first linear direction on one of the jamming plates to have the one of the jamming plates move along the shaft in the first linear direction thereby moving the other one of the jamming plates and the vehicle seat in the first linear direction, wherein the second pair of solenoids applies a second linear force in an opposed second linear direction on the other one of the jamming plates to have the other one of the jamming plates move the along the shaft in the second linear direction thereby moving the one jamming plate and the vehicle seat in the second linear direction.

17. The vehicle seat assembly of claim 16 wherein:

the first pair of solenoids removes the linear forces on the jamming plates causing the jamming plates to move back to the biased configuration.

* * * * *